(12) United States Patent
Dresher

(10) Patent No.: US 8,172,243 B2
(45) Date of Patent: May 8, 2012

(54) JOGGING STROLLER

(75) Inventor: Michael J. Dresher, Wichita, KS (US)

(73) Assignee: Michael J. Dresher KS (US)

( * ) Notice: Subject to any disclaimer, the term of this patent is extended or adjusted under 35 U.S.C. 154(b) by 1160 days.

(21) Appl. No.: 11/293,199

(22) Filed: Dec. 5, 2005

(65) Prior Publication Data

US 2007/0126195 A1  Jun. 7, 2007

(51) Int. Cl.
*B62B 7/00* (2006.01)
(52) U.S. Cl. .................................. 280/47.38; 280/47.41
(58) Field of Classification Search ............... 280/242.1, 280/244, 248, 247, 253, 257, 258, 47.38, 280/62; 482/62
See application file for complete search history.

(56) References Cited

U.S. PATENT DOCUMENTS

| | | | | |
|---|---|---|---|---|
| 3,666,292 A * | 5/1972 | Bartos ........................... 280/234 |
| 4,453,729 A * | 6/1984 | Lucken ....................... 280/250.1 |
| 4,460,190 A * | 7/1984 | Spiess ........................... 280/247 |
| 4,560,181 A * | 12/1985 | Herron ....................... 280/250.1 |
| 4,733,880 A * | 3/1988 | Wilhelm, III ................. 280/234 |
| 4,993,732 A * | 2/1991 | Wedemeyer ............... 280/250.1 |
| 5,272,928 A * | 12/1993 | Young .............................. 74/137 |
| 5,562,300 A | 10/1996 | Nelson |
| 5,674,165 A * | 10/1997 | Cohen et al. .................. 482/127 |
| 5,690,346 A * | 11/1997 | Keskitalo ....................... 280/234 |
| 5,826,897 A * | 10/1998 | Beard ......................... 280/250.1 |
| 5,876,309 A * | 3/1999 | Archey ............................. 482/66 |
| 5,941,547 A * | 8/1999 | Drake ........................... 280/243 |
| 6,032,970 A * | 3/2000 | Porter ........................... 280/234 |
| 6,196,947 B1 * | 3/2001 | Anderson ....................... 482/51 |
| 6,708,997 B2 * | 3/2004 | Chait ............................. 280/245 |
| 6,715,780 B2 * | 4/2004 | Schaeffer et al. ............. 280/248 |
| 6,722,689 B2 * | 4/2004 | Kreamer ....................... 280/642 |
| 6,755,430 B1 * | 6/2004 | Watwood et al. .......... 280/250.1 |
| 6,820,885 B1 * | 11/2004 | Oshimo ........................ 280/243 |
| 6,893,035 B2 * | 5/2005 | Watwood et al. .......... 280/242.1 |
| 6,942,234 B1 * | 9/2005 | Chait ............................. 280/244 |

* cited by examiner

*Primary Examiner* — Jeffrey J Restifo
(74) *Attorney, Agent, or Firm* — Sheldon J. Moss; Chad M. Herring

(57) ABSTRACT

A stroller is provided that features a frame element and at least one wheel supporting the frame, a first arm member configured to be gripped by a human hand mechanically coupled to the frame element such that the first arm member moves in a reciprocating manner with respect to the frame element, and a second arm member configured to be gripped by a human hand mechanically coupled to the frame element such that the second arm member moves in a reciprocating manner with respect to the frame element. A coupling member is provided that mechanically couples the first arm member to the second arm member such that the reciprocating movement of the first arm member is substantially maintained in opposition to the reciprocating movement of the second arm member whereby the natural periodic movement of human arms during walking or jogging is facilitated.

20 Claims, 21 Drawing Sheets

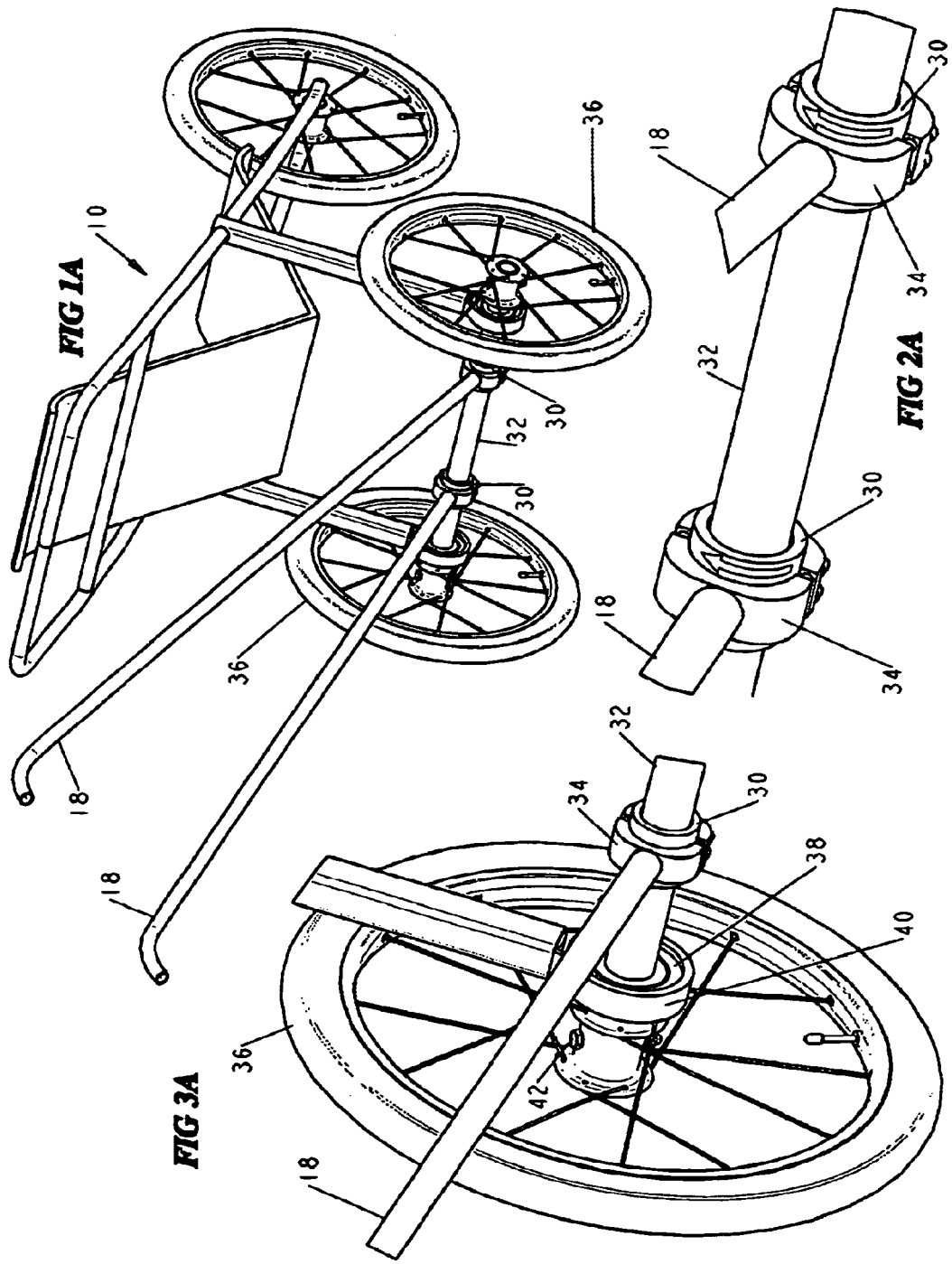

SECTION A-A

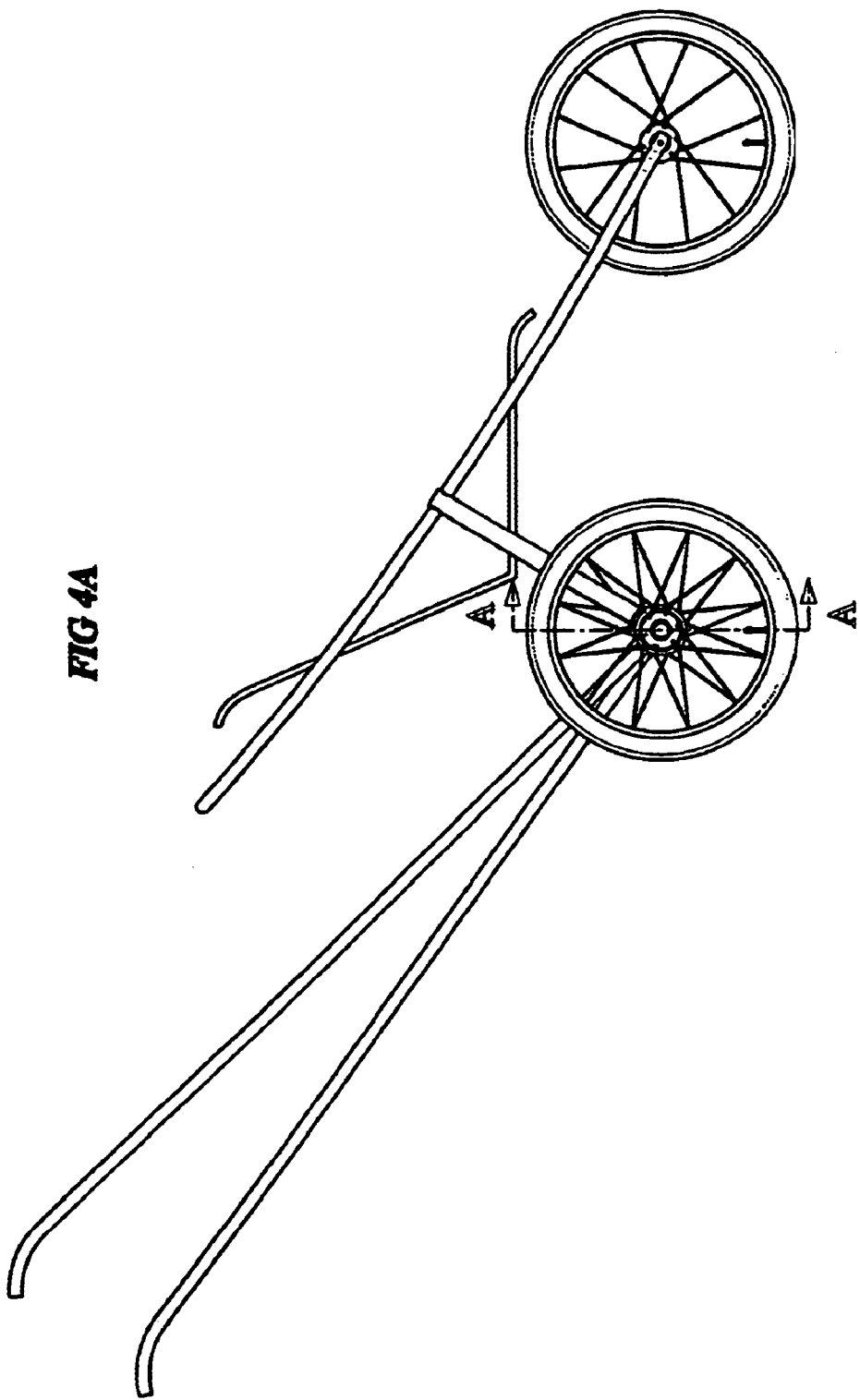

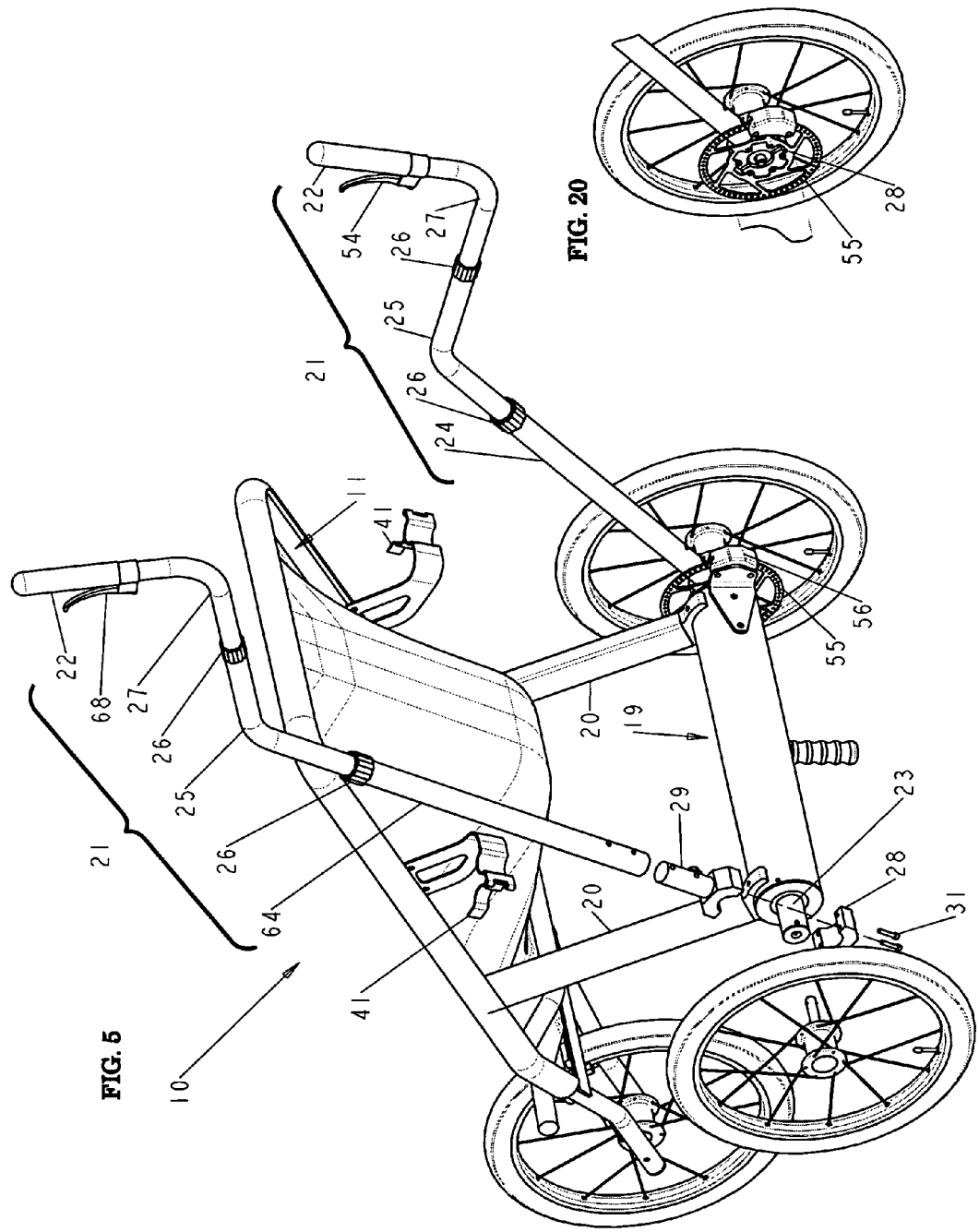

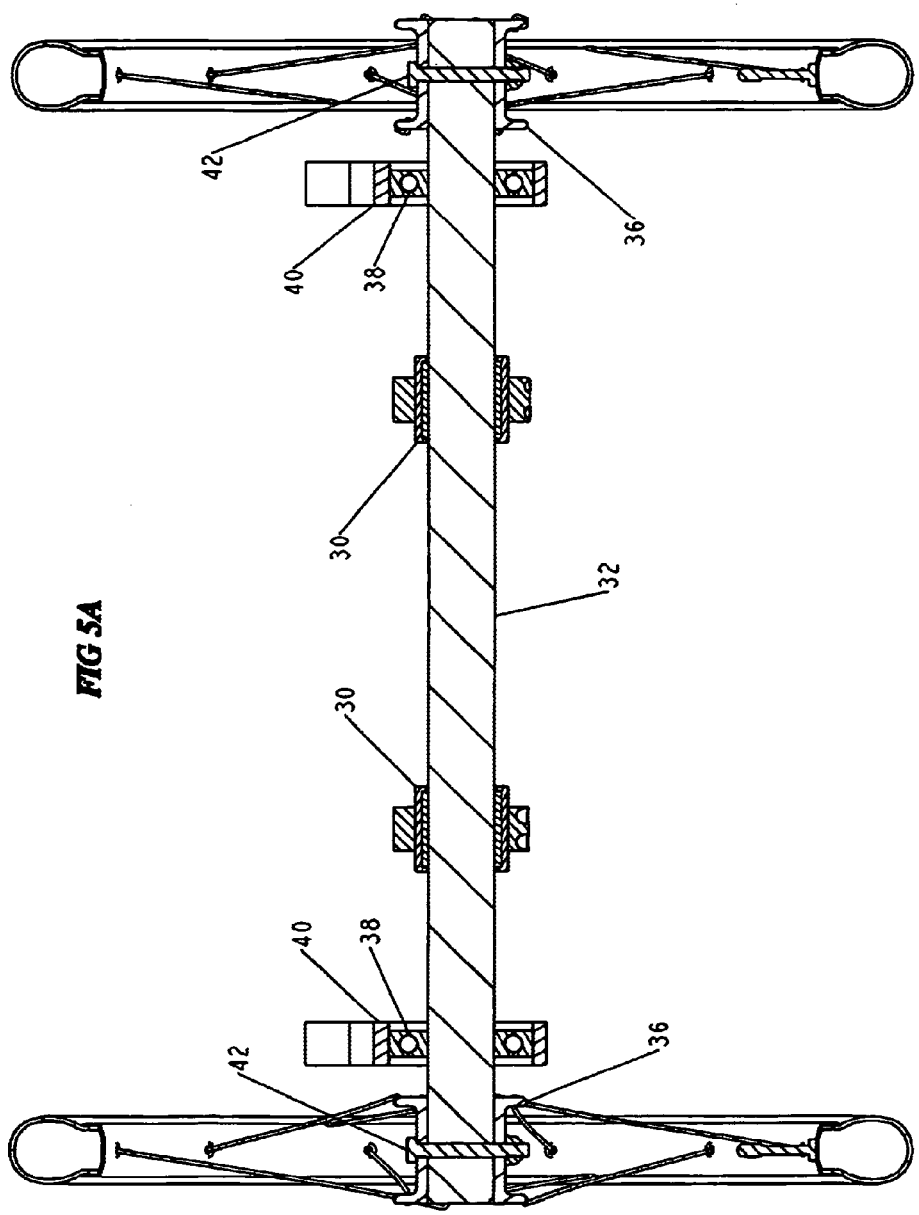

FIG. 6

$y = A \sin((2\pi/B)x)$ $c = -y$ y = position of left arm c = position of right arm A = amplitude B = period x = time

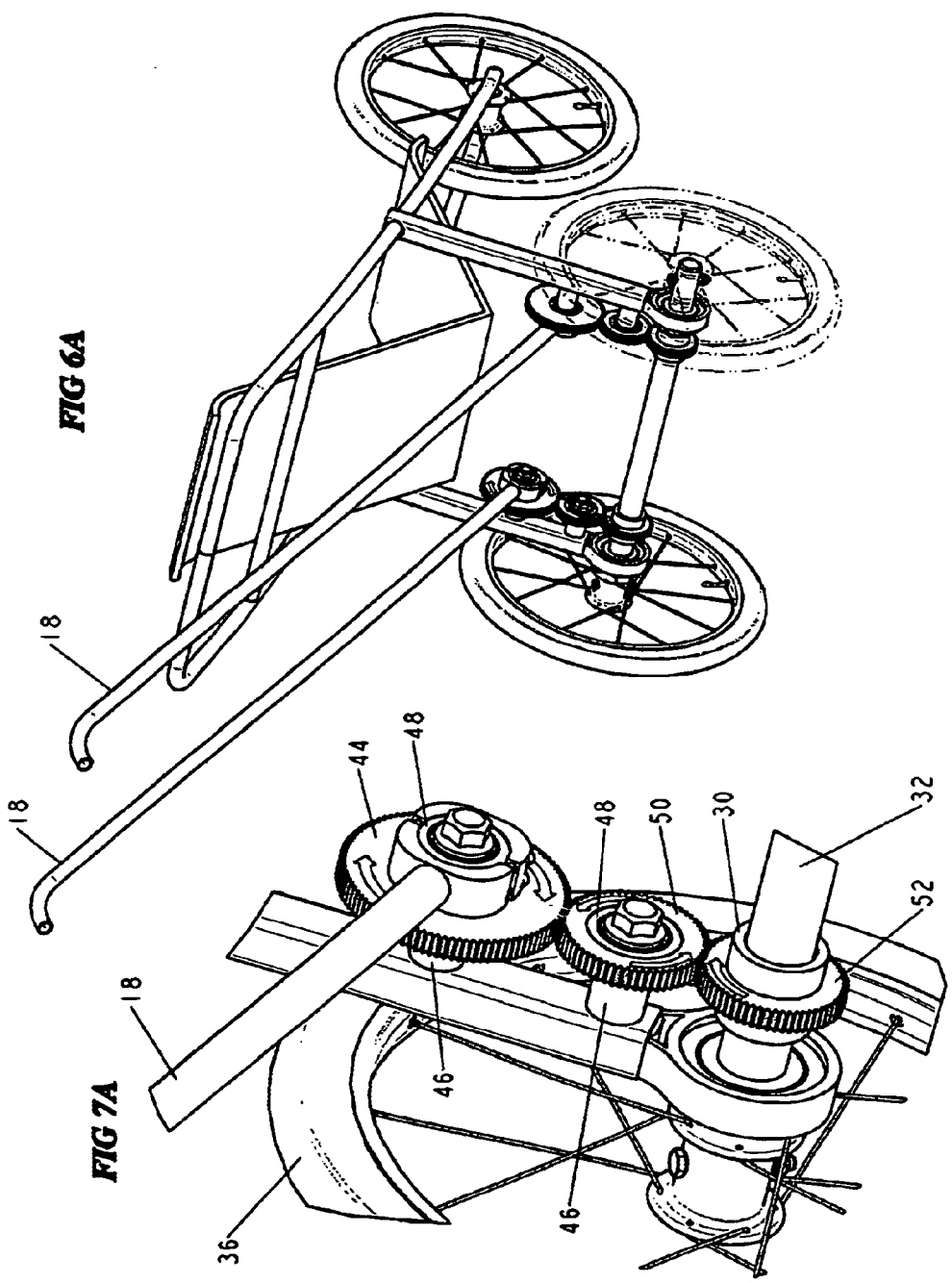

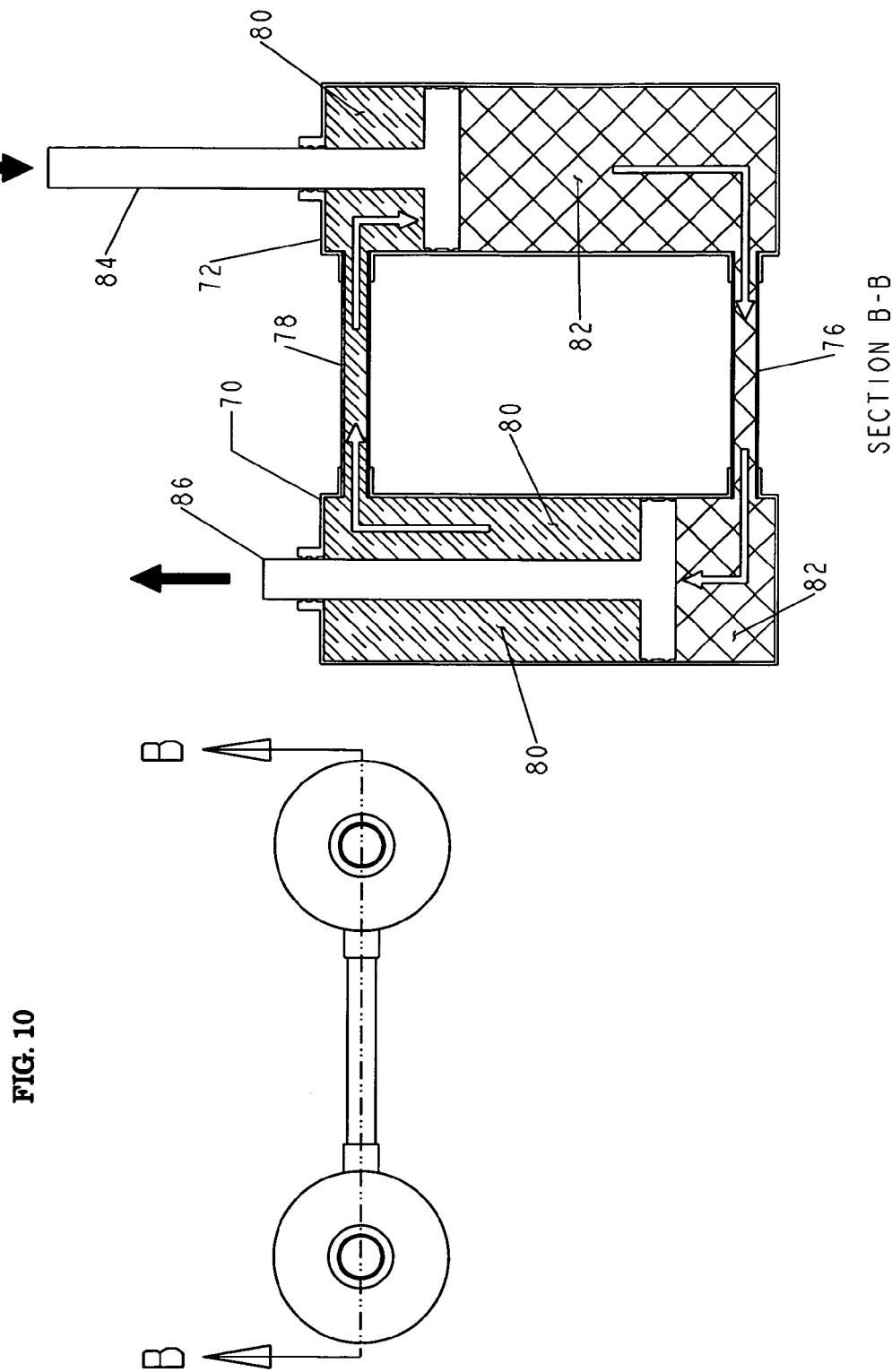

SECTION C-C

JOGGING STROLLER

BACKGROUND OF THE INVENTION

1. Field of the Invention

The invention relates to a stroller and more particularly to a jogging stroller that facilitates the natural periodic arm movement of the person propelling the stroller while jogging.

2. Description of the Related Art

A conventional jogging stroller is typically configured as a carriage with three wheels that enables the user to jog while pushing the stroller. However, current designs inhibit the natural arm rhythm of a runner as she/he pushes the stroller forward, because the only way to transfer force to the stroller is through the stationary push-bar style handle. Trying to propel the stroller through the stationary bar while running becomes uncomfortable; as a result the user of the stroller resorts to methods for propelling the stroller that are not safe for the child occupant and/or tries to maintain contact with the stroller in ways not recommended by the manufacturer.

It is well known that, during running, the limbs of the human body move in a highly synchronous and rhythmic manner. (*The Evolution of the Study of the Mechanics of Running: Relationship to Injury*, McClay I., J Am Podiatry Med Assoc. 2000 March; 90 (3): 133-48). For example, at any given time during the act of running, the position of each arm is highly dependent on the position of the other. The same can be said for leg motion during running. Positional dependence of limbs while running is crucial to the human body's ability to locomote in a fluid, balanced and coordinated manner. All of the patents, patent publications, and non-patent literature cited in this Specification are hereby expressly incorporated by reference herein.

It is also well known that if any one of the four human limbs is prevented from its natural movement during running, then overall rhythmicity and limb coordination is not possible. Disruption of coordinated limb motion during running can result in reduced energy efficiency, deterioration of general running performance and, in some cases, an increased risk of injury to the runner.

There have been several past attempts to address this issue. For example U.S. Pat. No. 6,196,947 discloses a stroller having a pair of independent pivotally connected arms with handles for the user to grasp and a device to generate resistance to the arms' forward pivoting motion. By overcoming the force of the resistance device, be it an elastic cord, spring, piston or bellows, the user generates a reaction force on the frame of the stroller that propels it in a forward direction. Similarly, U.S. Pat. No. 5,876,309 has a pair of independent pivoting arms also attached to resistance devices, in this case shock absorbers, and is propelled in a similar manner. U.S. Pat. No. 6,722,689 also operates with a resistance device. In this patent a coil spring is used on each arm's handle. Another device, U.S. Pat. No. 5,674,165 has independent pivotally connected arms and a friction resistance device on each arm. This device requires the user to overcome the resistance on both the forward and backward stroke of the arm and has no means for establishing an inter-dependent motion relationship between the jogger's arms. The arm paths of these prior art devices are better than the stationary bar for addressing the problem of jogging arm motion, but these devices do not address the inter-dependent motion relationship between the jogger's arms during the act of pushing the stroller. Each arm's movement is independent of the other, which means balancing the force between the jogger's arms to propel the stroller and coordinating the arms' movement relative to one another is not facilitated in these devices. Such resistance devices cause the user's input energy to surge from one arm to the other.

As noted above, there are a number of strollers available designed to be pushed by a jogger. However, none of these devices address the positional dependence in relation to the movement of the jogger's arms during the act of pushing the stroller. As a result the jogger is required to input a force for each arm that surges from the total force necessary to push the stroller to zero. There is, therefore, a need for a jogging stroller that can accommodate the user's natural and synchronous arm motion while simultaneously distributing between both of the jogger's arms the force required to propel the stroller.

SUMMARY OF THE INVENTION

The present invention provides a jogging stroller that facilitates the natural and periodic arm movement of the person propelling the stroller while walking, jogging or running.

Pursuant to the present invention, a stroller is provided that features a frame element and at least one wheel supporting the frame, a first arm member configured to be gripped by a human hand mechanically coupled to the frame element such that the first arm member moves in a reciprocating manner with respect to the frame element, and a second arm member configured to be gripped by a human hand mechanically coupled to the frame element such that the second arm member moves in a reciprocating manner with respect to the frame element. A coupling member is provided that mechanically couples the first arm member to the second arm member such that the reciprocating movement of the first arm member is substantially maintained in opposition to the reciprocating movement of the second arm member whereby the natural periodic movement of human arms during walking or jogging is facilitated.

In an embodiment of the present invention, the first arm member and the second arm member are mechanically coupled by a coupling member that comprises at least one gear.

In an embodiment of the present invention, the first arm member and the second arm member are mechanically coupled by a coupling member that comprises at least one piston and fluid to move the piston.

In an embodiment of the present invention, the first arm member and the second arm member are electromechanically coupled.

In an embodiment of the present invention, the first arm member and the second arm member are mechanically coupled by a coupling member that comprises at least, one link.

In an embodiment of the present invention, the first arm member and the second arm member are configured such that they can be made substantially immobile with respect to the frame member for use as at least one handle.

In an embodiment of the present invention, the first arm member and the second arm member form a single handle.

In an embodiment of the present invention, the stroller comprises three wheels.

In an embodiment of the present invention, the first arm member and the second arm member are configured such that they can be made substantially immobile with respect to the frame member for use as at least one handle.

In an embodiment of the present invention, a coupling member mechanically couples the first arm member and the second arm member such that the position of the first arm member relative to the position of the second arm member can be defined with the mathematical equation:

$$y = A \sin((2\pi/B)x)$$

$$c = -y$$

wherein, in one complete cycle of arm movement during the act of pushing the stroller, y equals the position of the left arm, c equals the position of the right arm, A equals amplitude and represents half the distance between one arm's maximum forward position and maximum back position, B equals period and represents the time to complete one cycle of arm movement and x is time.

BRIEF DESCRIPTION OF THE DRAWINGS

FIG. 5 is a perspective view of the back side of the stroller represented in FIG. 1.

FIG. 6 is an equation of the positional relationship between arms.

FIG. 10 is a top view of a hydraulic system.

FIG. 11 is a cross-sectional view taken along line B-B in FIG. 10.

FIG. 17 is a detailed partial perspective view of the motion controller center assembly as seen in FIG. 3.

FIG. 20 is a detailed partial perspective view of components on the right end of the motion controller as seen in FIG. 5.

DETAILED DESCRIPTION

Figure 1:
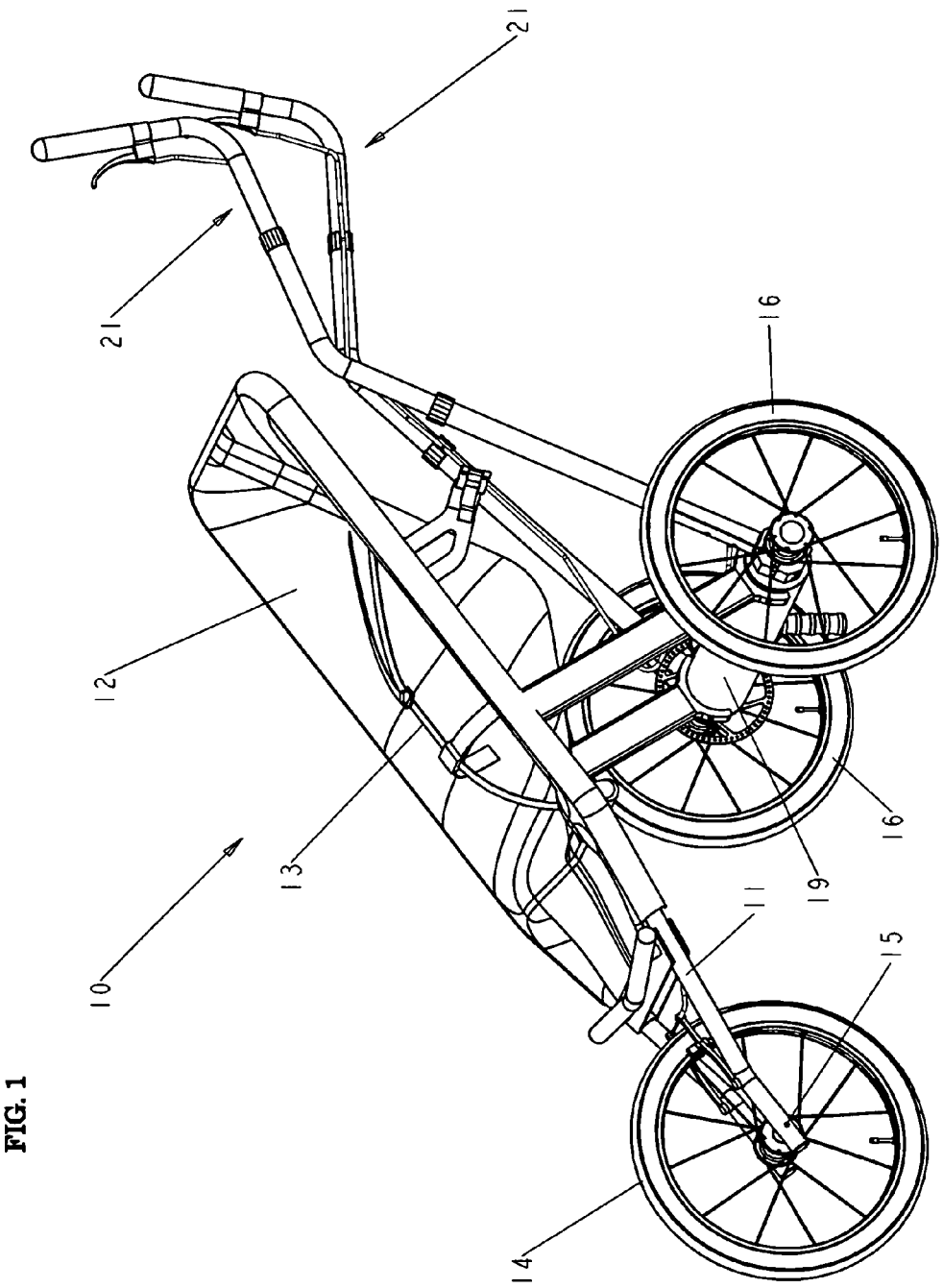
FIG. 1 is a perspective view of a stroller according to one embodiment of the present invention in the jogging position.
Figure 2:
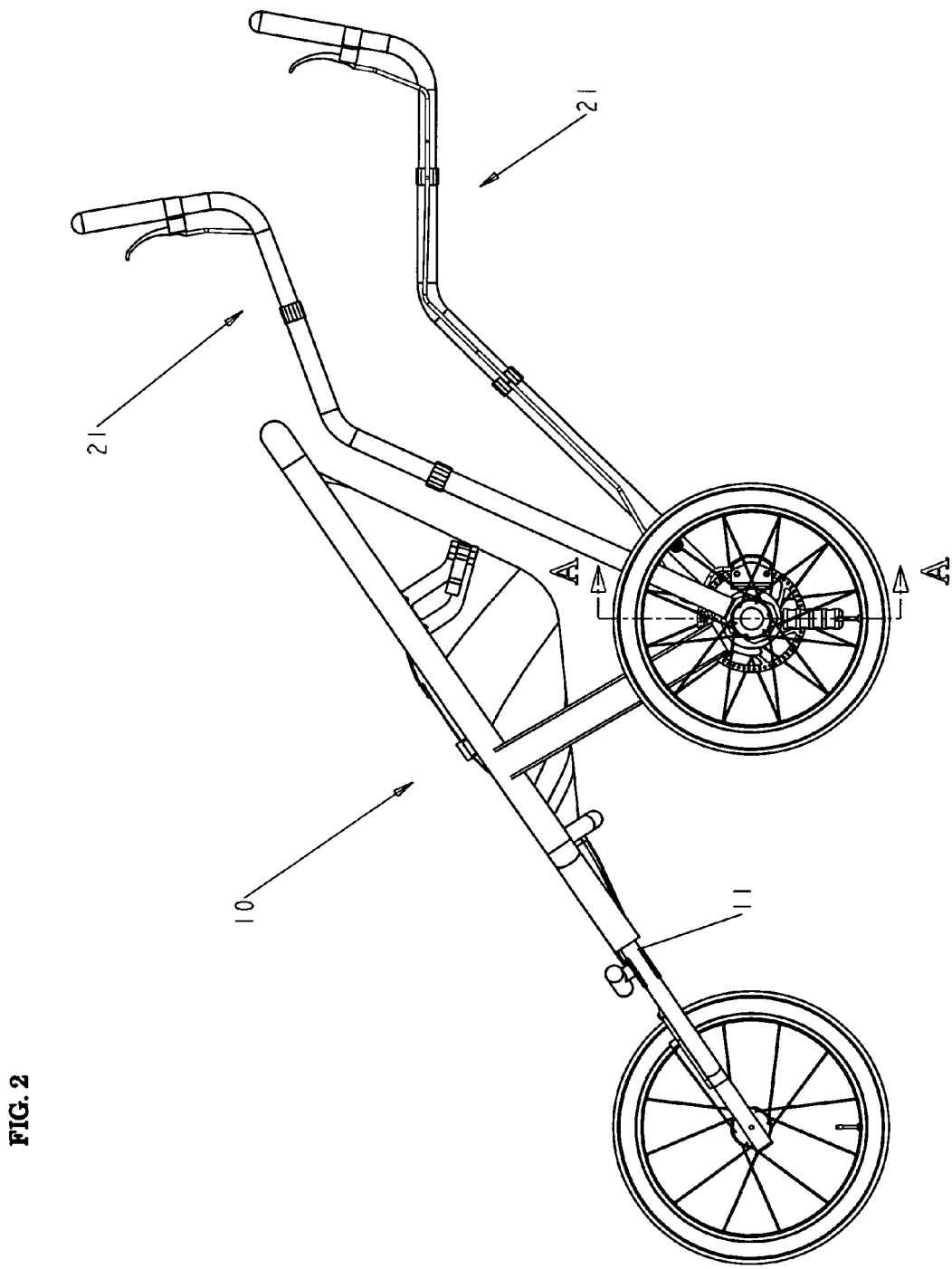
FIG. 2 is a side view of FIG. 1

Turning now to the drawings in detail where like elements are indicated with like numbers in each of the several views, FIGS. 1 and 2 illustrate jogging stroller 10 according to one embodiment of the present invention. Stroller 10 includes a frame 11 supporting a seat 12 and optional safety belts 13 to secure a passenger to the seat 12. A wheel 14 supports the front of the frame 11 by securing the wheel's axle 15 to the frame 11 on each side of the wheel 14. On each side and at the rear of the frame 11 are wheels 16, each of which is axially aligned to the opposing wheel.

Interposed between wheels 16 is a coupling member. In an exemplary embodiment, the coupling member is motion controller 19. The motion controller 19 is a mechanism for facilitating natural limb movement and facilitates an even distribution of force between the user's arms as required to propel the stroller. While in FIG. 1 the motion controller is depicted adjacent the rear axle assembly, it is understood that the mechanism can be located anywhere on the jogging stroller as long as it allows force to be communicated between the user and the stroller.

Figure 3:
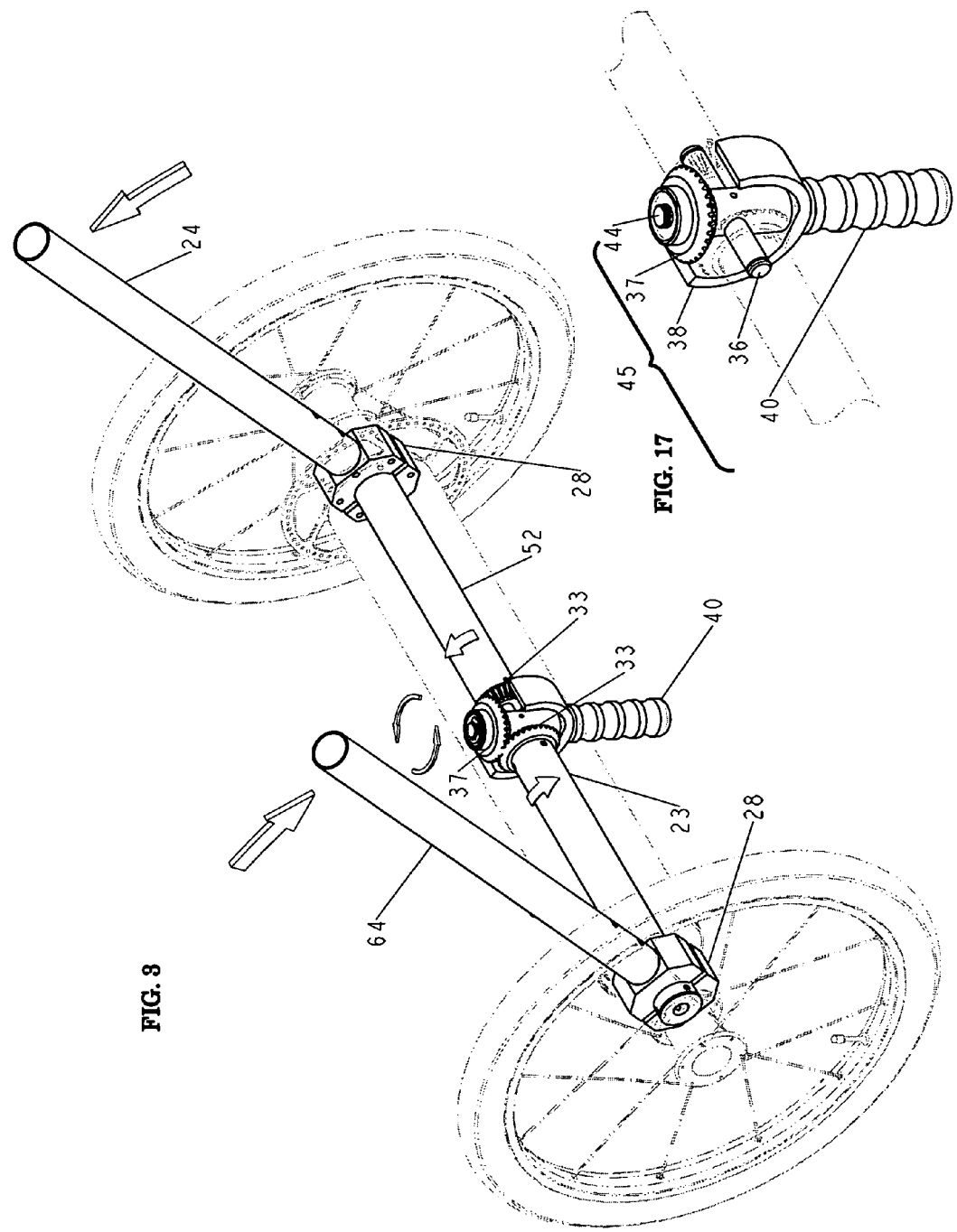
FIG. 3 is a partial perspective view of the lower arm sections and motion controller.

Extending from the motion controller are force transmitting arm members 21. Arm members 21 interact with the motion controller 19 such that the reciprocating movement of one of the arm members is maintained in substantial opposition to the reciprocating movement of the second arm member such that the natural periodic movement of human arms during walking, jogging, or running is facilitated. An example of the motion controller mechanism is depicted in FIG. 3. A cross-sectional view taken from line A-A in FIG. 2 of the motion controller mechanism is shown in FIG. 4.

Figure 4:
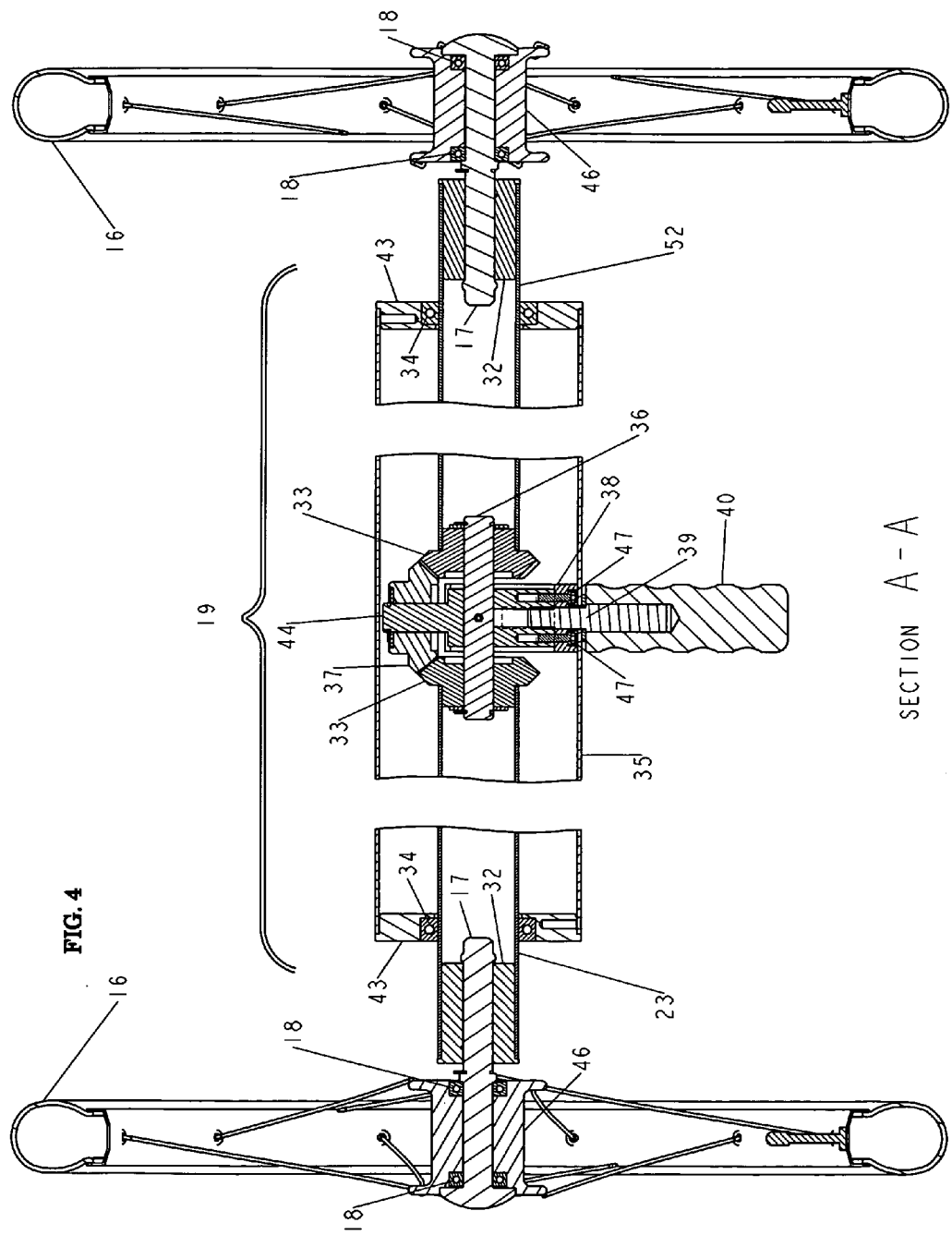
FIG. 4 is a cross-sectional view taken along line A-A in FIG. 2.

As seen in FIG. 4 each rear wheel 16 has an axle 17 coupled to the wheel hub 46 with roller bearings 18. The axles 17 of the rear wheels 16 are supported by the motion controller 19.

As see clamped in FIG. 3 and exploded in FIG. 5 the lower end of each arm 64, 24 is coupled to a drive tube 23, 52 with a split clamp 28. When the two clamp halves are tightened, the clamping force on the drive tubes prevents any relative axial rotation between the arms 64, 24 and the drive tubes 23, 52. In FIG. 4, the drive tubes 23, 52 are centered on the axis of rotation of the rear wheels 16 and can pivot within the motion controller 19.

As seen in FIG. 3, when an arm 24, 64 moves from front to back this movement translates to an axial rotation of a drive tube 23, 52. Referencing FIG. 4, each drive tube 23, 52 has attached to its outer end a bushing 32 and attached to its inner end a bevel gear 33. Both a bevel gear 33 and a bushing 32 are rigidly connected to each drive tube 23, 52 so that no relative motion between a drive tube 23, 52, bevel gear 33 and bushing 32 is possible. When a drive tube 23, 52 turns, its bevel gear 33 and its bushing 32 turn with it. The outer end of each drive tube 23, 52 is supported and rotates inside a bearing 34 that is secured inside a carrier bushing 43 rigidly connected to the tube 35 that makes up the outer portion of the motion controller 19. The bevel gear 33 on the inside end of each drive tube 23, 52 is supported and rotates on a pin 36 that is centered inside the motion controller 19. The bevel gear 33 at the inside end of each drive tube 23, 52 is coupled to a center bevel gear 37 by way of the teeth mesh between the gears. This center bevel gear 37 is the coupling element between the two arms 21 as seen in FIG. 5. Referencing FIG. 3, by means of the center bevel gear 37 interacting with bevel gears 33 and drive tubes 23, 52 each arm member 64, 24 is maintained in opposition to the reciprocating movement of the second arm member.

FIG. 3 shows the relative movement of the lower right arm tube 24 and lower left arm tube 64 and their relationship to the center bevel gear 37. In this view the lower right arm tube 24 is moving forward. This movement causes the bevel gear 33 at the end of the right arm drive tube 52 to rotate in a clock-wise direction as viewed from the right. Since the bevel gear 33 of the right drive tube 52 is meshed with the center bevel gear 37 a rotation is caused in the center bevel gear 37. Since the center bevel gear 37 is also meshed to the bevel gear 33 of the left drive tube 23 a rotation opposite of the bevel gear 33 of the right drive tube 52 results in the bevel gear 33 of the left drive tube 23. This opposite rotation of the left drive tube 23 translates into the lower left arm tube 64 moving in the opposite direction of the lower right arm tube 24; in this view, backward. Because the left arm tube 64 and right arm tube 24 are coupled together, in this case through a gear 37, a positional dependence is established between the arms. As one arm moves the other arm moves in the opposite direction.

Figure 7:
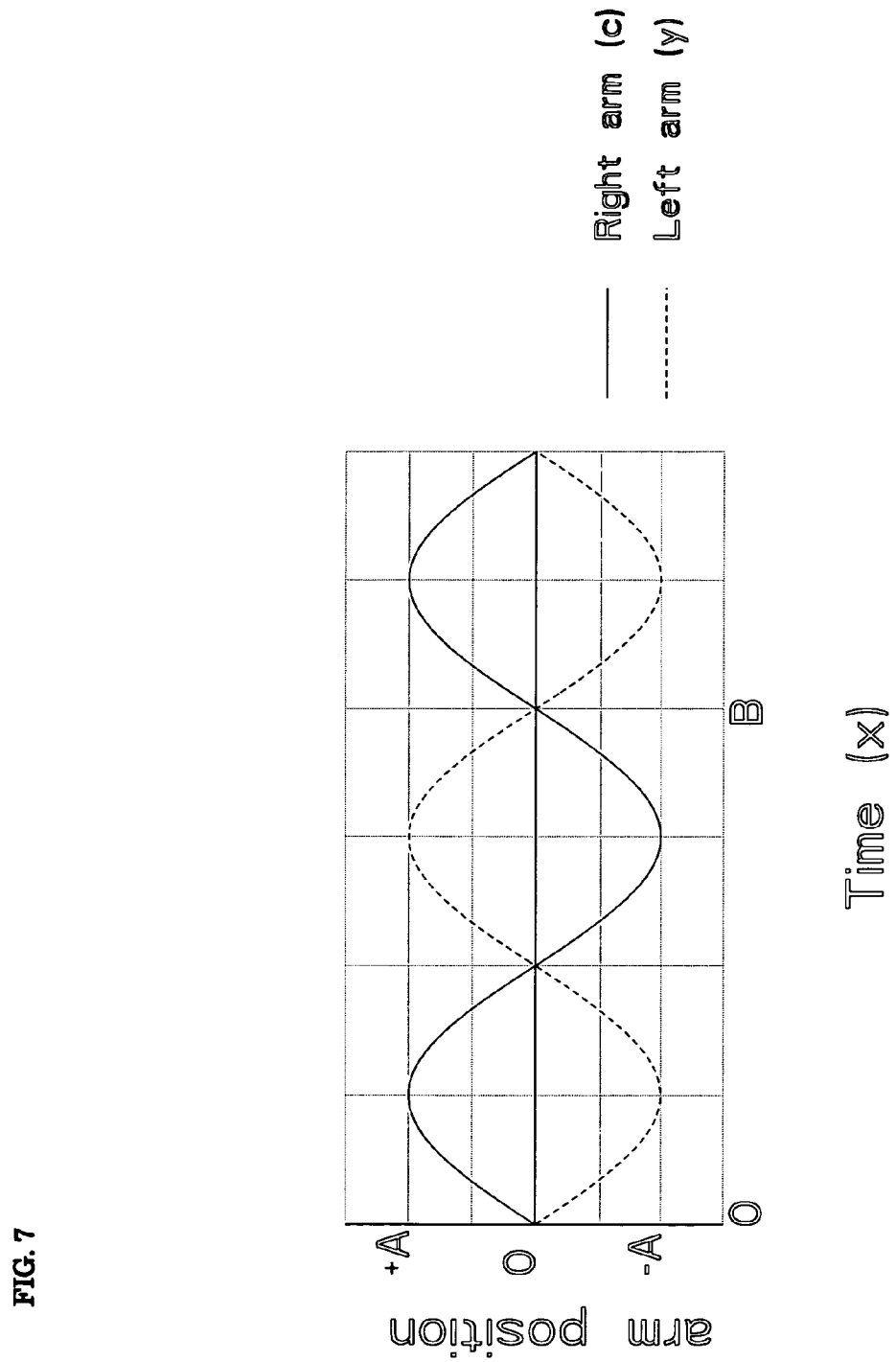
FIG. 7 is a graph of the equations of FIG. 6 showing the positional relationship between arms.
Figure 8:
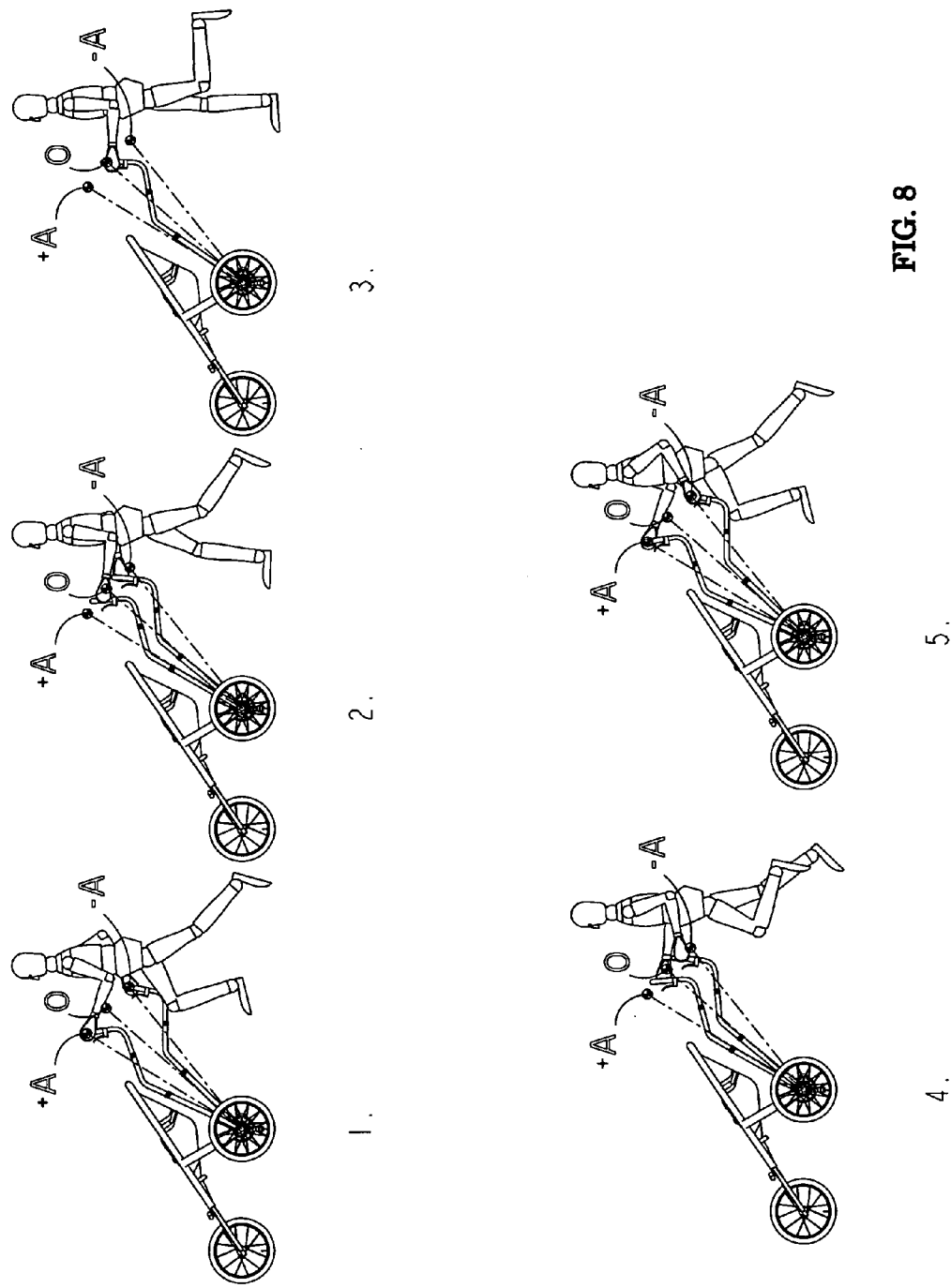
FIG. 8 is a pictogram relating the jogger's arm position to the equation of positional relationship of FIG. 6.

The positional dependence relationship can be approximated mathematically with the equations in FIG. 6:

$$y = A \sin((2\pi/B)x)$$

$$c = -y$$

where y is the position of the left arm, c is the position of the right arm, A is the amplitude B is the period and x is time. This equation is graphically depicted in FIG. 7. This FIG. shows the relative positions of the right and left arm with +A representing the arm at its maximum forward swing position and −A representing the arm at its maximum backward swing position. The quantitative value of A is determined by the range of motion developed from each individual user's limb path during walking, jogging or running. At the zero position the arms are positioned between the maximum forward and backward positions and are substantially aligned with one another as viewed from the side of the stroller. In the pictogram of FIG. 8 the positions of +A, 0, and −A are over-laid on the form of a jogger pushing the stroller. In the first frame the jogger's left arm is at the maximum forward swing, position +A, while the right arm is at the maximum back swing, position −A. Frame two shows the left arm moving back toward the zero position and the right arm moving forward toward the zero position. In frame three both of the jogger's arms are aligned and at the zero position. Frame four shows the joggers left arm continuing to move back from the zero position toward −A, and the right arm continuing to move forward from the zero position toward +A. In frame 5, the jogger has completed one half cycle as the left arm has reached the −A position and the right arm the +A position. The amplitude, A, is the maximum extent of travel as measured from a point of equilibrium. In this case the equilibrium is the zero position, when the arms are aligned with each other as in frame 3. The period B is defined as the time to complete one cycle. One cycle can be defined as an arm which starts at the +A position, moves back through the zero position until it reaches the −A position and then is moved forward through the zero position until is reaches the +A position. Any device or system, which permits arm movement satisfying the above equation, is contemplated for use with the stroller of the present invention.

Figure 9:
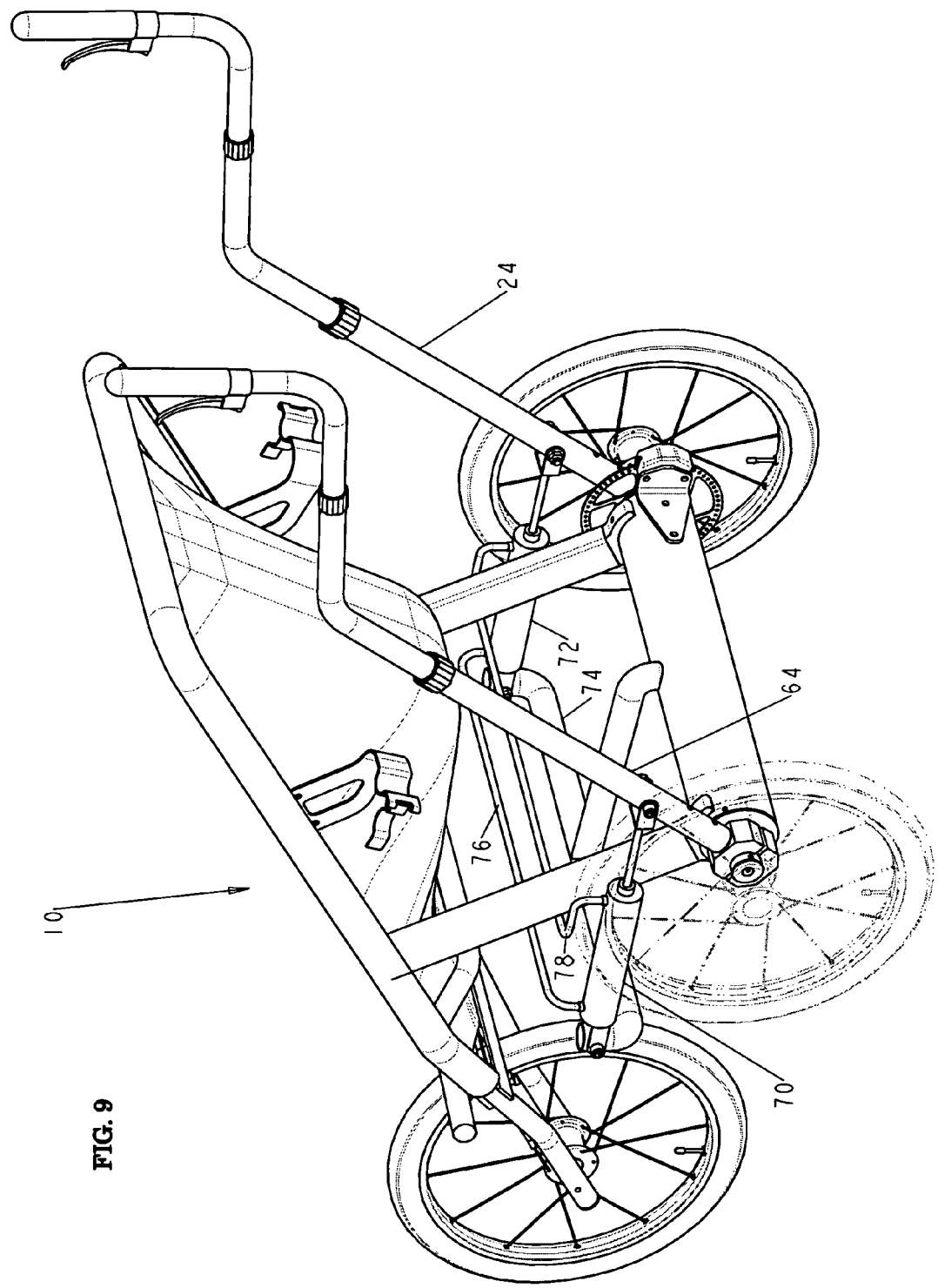
FIG. 9 is a perspective view of a stroller according to one embodiment using hydraulics.

Note that while the embodiment shown in the FIGS. 1 thru 6 relies on the use of gear mechanisms, any device or system that establishes positional dependence between the arms can be used in the stroller of the present invention. These include, but are not limited to, hydraulic devices, pneumatic devices, electromechanical devices, or any other mechanical device or system which maintains each arm member in substantial opposition to the reciprocating movement of the second arm member. For example, a piston coupled with hydraulic fluid could function as the motion controller in the stroller of the present invention. As an example FIG. 9 shows a stroller 10 with a left cylinder 70 and right cylinder 72 each charged with either a liquid or a gas. The base end of each cylinder is connected to a supporting frame member 74 and the rod end of each cylinder is connected to the left arm tube 64 and right arm tube 24, respectively. When an arm tube moves forward it compresses the respective cylinder and when an arm moves backward it extends its respective cylinder. The cylinders fluid chambers are connected by a base end fluid line 76 and a rod end fluid line 78 which permit fluid transfer from one cylinder to the other. FIG. 10 is a simplified end view of the cylinders and the connecting lines. The fluid circuit cross-section of FIG. 11 taken along line B-B of FIG. 10 shows the rod end fluid line 78 connecting the cylinders' rod end fluid volumes 80 and the base end fluid line 76 connecting the cylinders' base end fluid volumes 82. The compressibility of a liquid fluid is considered negligible, and in this application a gas pressurized to a level higher than the external forces applied to the cylinders can also act as an incompressible fluid. Therefore, the volume of the base end fluid remains constant regardless of whether there is more fluid in one cylinder or the other. This also applies to the volume of fluid occupying the rod end of the cylinders. As the rod 84 of the right cylinder 72 is compressed, fluid is forced from its base into the base of the left cylinder 70, which forces the rod 86 of the left cylinder 70 to extend. Simultaneously, the extension of the rod 86 of the left cylinder 70 forces fluid into the rod end of the right cylinder 72. These cylinders do not allow fluid to transfer between the rod and base ends, therefore, the base end volume of fluid 82 and the rod end volume of fluid 80 remain independent of each other and each at a constant volume. Collectively, since the fluid is considered incompressible, and the volumes are considered constant and unmixed, as one cylinder's rod is moved the other cylinders rod must move in the opposite direction an amount equal to the first. This system using an incompressible fluid acts as a motion controller and satisfies the equation of FIG. 6.

Figure 12:
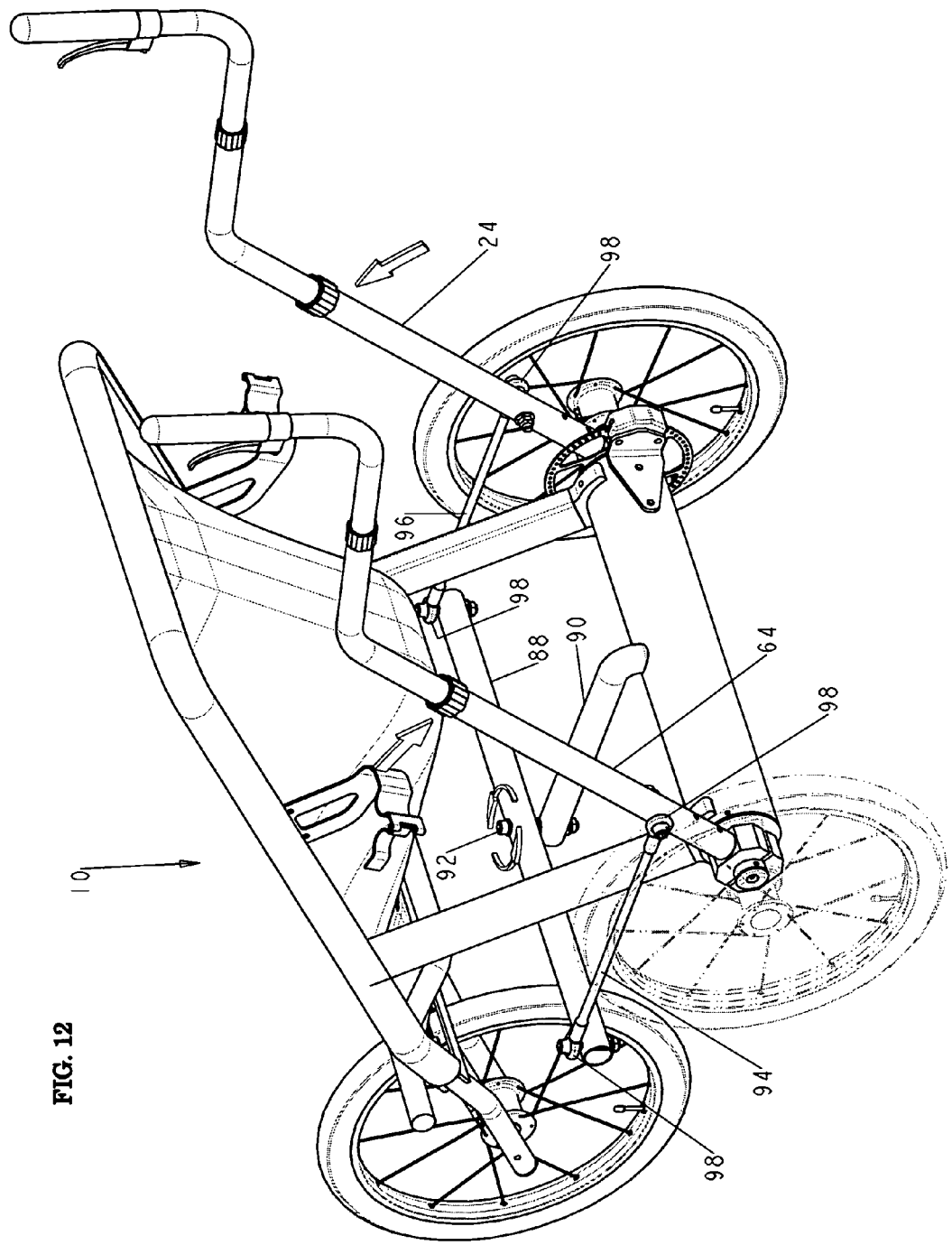
FIG. 12 is a perspective view of a stroller according to one embodiment using a linkage system.

The linkage arrangement shown in FIG. 12 is another example of a mechanical device that serves as a motion controller. In this embodiment a center structural link 88, supported by a frame member 90, is free to pivot about a center pin 92. Between the left end of the structural link 88 and the left arm tube 64 is the left transfer link 94. Between the right end of the structural link 88 and the right arm tube 24 is the right transfer link 96. At each end of a transfer link is a ball joint 98. As depicted by the arrows in FIG. 12, when the right arm tube 24 moves forward the right transfer link 96 causes a rotation of the center structural link 88, which causes the left transfer link 94 to constrain the motion of the left arm tube 64 to be the opposite of the right arm tube 24. This motion relationship between the left arm tube 64 and right arm tube 24 is consistent with the equation of FIG. 6.

Figure 13:
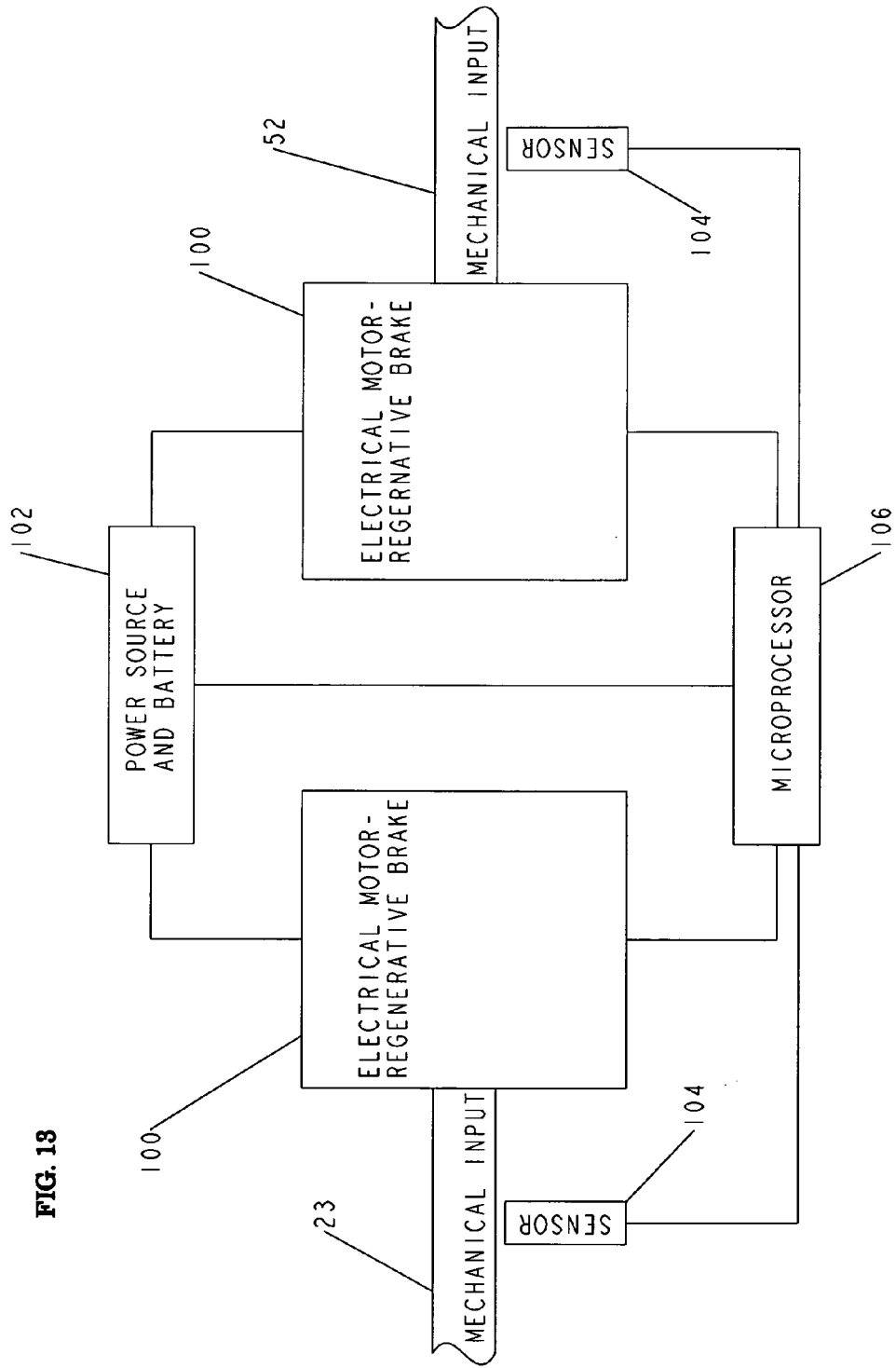
FIG. 13 is schematic of an electromechanical system.

FIG. 13 shows an embodiment of an electromechanical configuration of the motion controller. Mechanical input from the left drive tube 23 and the right drive tube 52 feeds into separate electrical motor-regenerative brake modules 100. These motor-brake modules 100 are energized from a power source 102, which also has electrical storage capability i.e. a battery. The positions of the left and right drive tubes 23, 52 are monitored by sensors 104, which send information to a microprocessor 106. The microprocessor 106 uses this positional information to control the motor-brake units 100. When an arm is sensed to be moving forward the microprocessor 106 instructs the motor-brake unit 100 to act as a regenerative brake. As the jogger applies force with one arm to overcome the brake, the reaction is for the stroller to move forward while the brake unit sends a charge to the battery. Simultaneously, the opposite motor brake unit 100 is energized to act as a motor and drives in a direction as to provide an equal force to the jogger's other arm. The microprocessor toggles each motor brake unit 100 back and forth between a motor and a brake depending on the signal received from the sensors 104 monitoring the position and direction of travel of the drive tubes 23, 52. The microprocessor also regulates how strong the regenerative brake will be and balances that with the force applied by the opposite motor so that the force on the jogger's arms remains nearly equal and in the proper position relative to the other.

Figure 14:
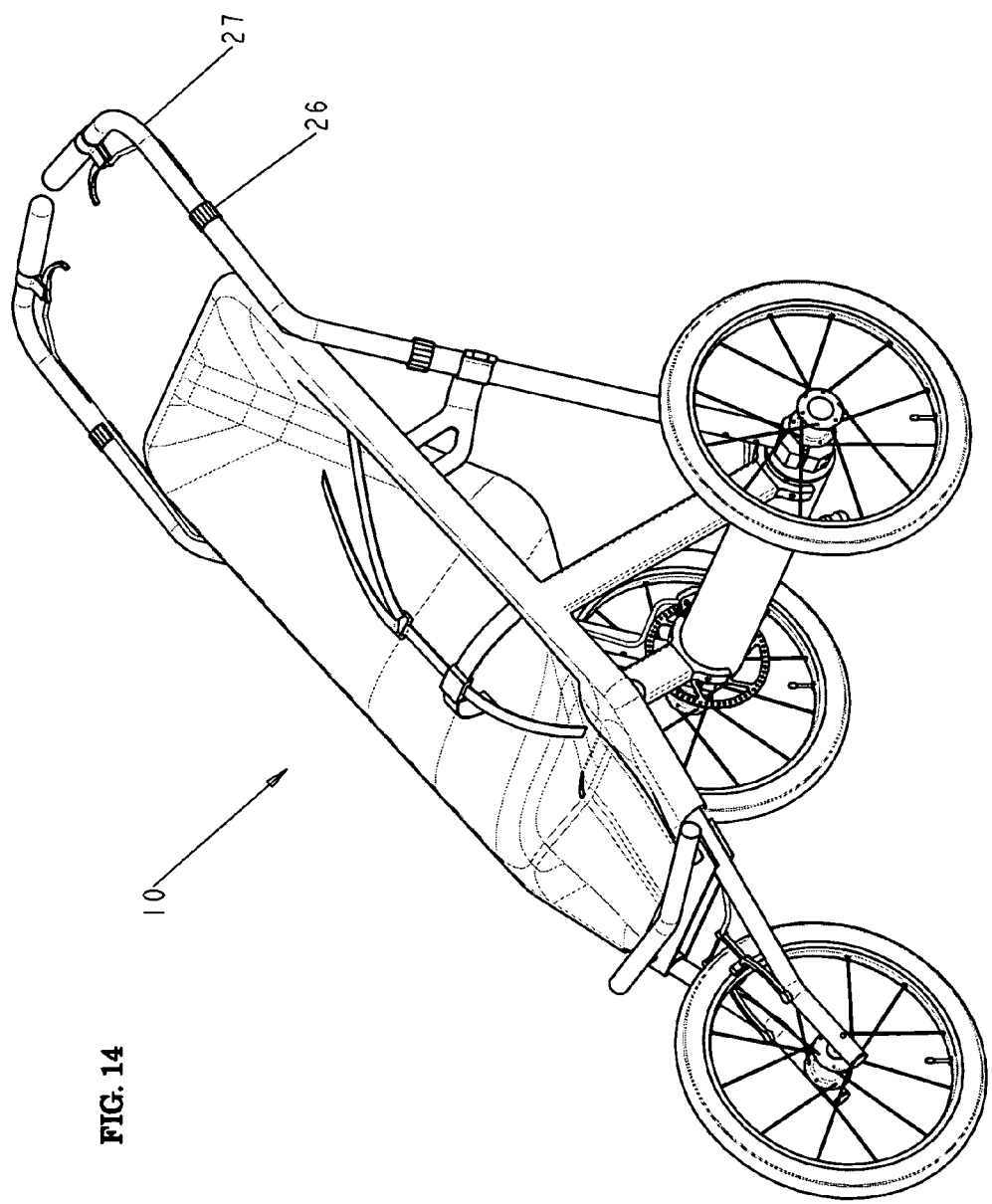
FIG. 14 is a perspective view of the stroller adjusted to the walking position.

FIG. 5 shows the motion controller 19 attached to the stroller frame 11 with a supporting member 20 from each side of the frame 11. At the upper end of each arm 21 is a handgrip 22, which the jogger uses to grasp the arms 21. Each arm 21 is made up of sections of telescoping type tubing. Using the left arm as an example, the lower section of tube 64 is coupled to the drive tube 23 with a split clamp, a top half 29 and a lower half 28. The opposite end of the lower tube section 64 is connected to the second section of tube 25 with a fitting 26. The fitting 26 is loosened to allow the second section 25 of tube to slide axially up or down within the lower section of tube 64. This movement is used to adjust the overall height of the handgrip 22 area up or down relative to the ground. The second section of tubing 25 is connected on its top end to the upper section of tubing 27 with another fitting 26. The second section of tubing 25 is bent toward the back of the stroller so when the upper section of tubing 27 is slid in or out of the second section of tubing 25 the handgrip 22 area moves toward or away from the stroller, respectively. The upper section of tubing 27 is also free to rotate axially within the second section of tubing 25. This allows the user to adjust the hand grip area 22 from a jogging position as seen in FIG. 1 to a traditional walking position as seen in FIG. 14. Note that the preceding description is a preferred embodiment for the arms of stroller of the present invention. The stroller arms can be configured from a single piece of material or in multiple sections as described above. Further, the stroller arms can be straight or bent depending upon the desired ergonomic effect.

Figure 15:
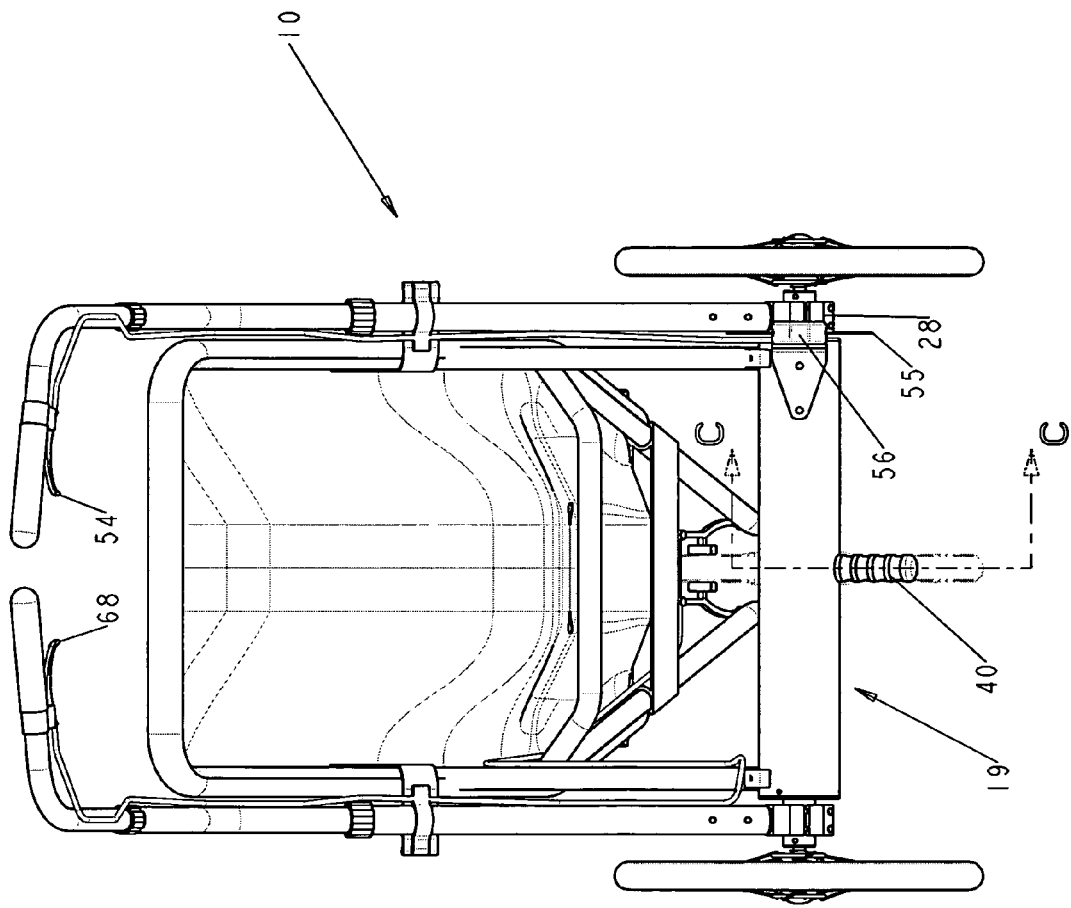
FIG. 15 is a back view of the stroller.
Figure 16:
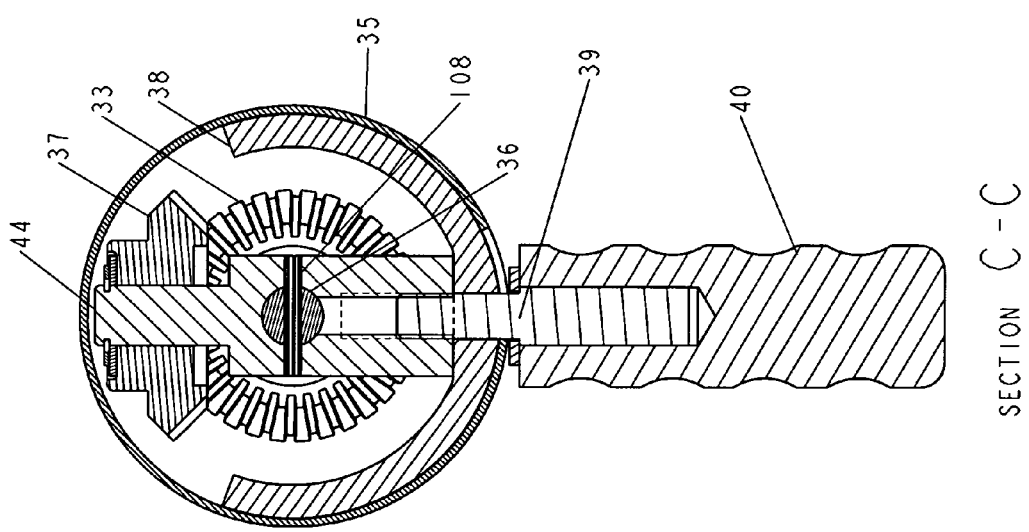
FIG. 16 is a cross-sectional view taken along line C-C in FIG. 15.

FIG. 15 is a rear view of the stroller 10. FIG. 16 shows a cross-section view of the motion controller 19 from line C-C of FIG. 15. The pin 36 supporting the bevel gear 33 on each end of the drive tubes is rigidly attached with a roll pin 108 to a center pin 44, which is the support for the center bevel gear 37. FIG. 4 shows the center pin 44 is attached to a center disk 38 with bolts 47. FIG. 16 shows that the center disk 38 locates itself inside a motion controller housing 35 by having an outside diameter slightly smaller than the inside diameter of the motion controller housing 35. The center disk 38 is located axially inside the housing 35 with the threaded stud 39 of the adjustment handle 40, which enters from the outside through a slot in housing 35 and through a hole in the center disk 38. This threaded stud 39 threads into the end of the center pin 44 opposite the center bevel gear 37. FIG. 17, a detailed view of components on FIG. 3, shows the center pivot assembly 45 which includes the pin 36, center pin 44, center bevel gear 37, handle 40, and center disk 38.

Figure 18:
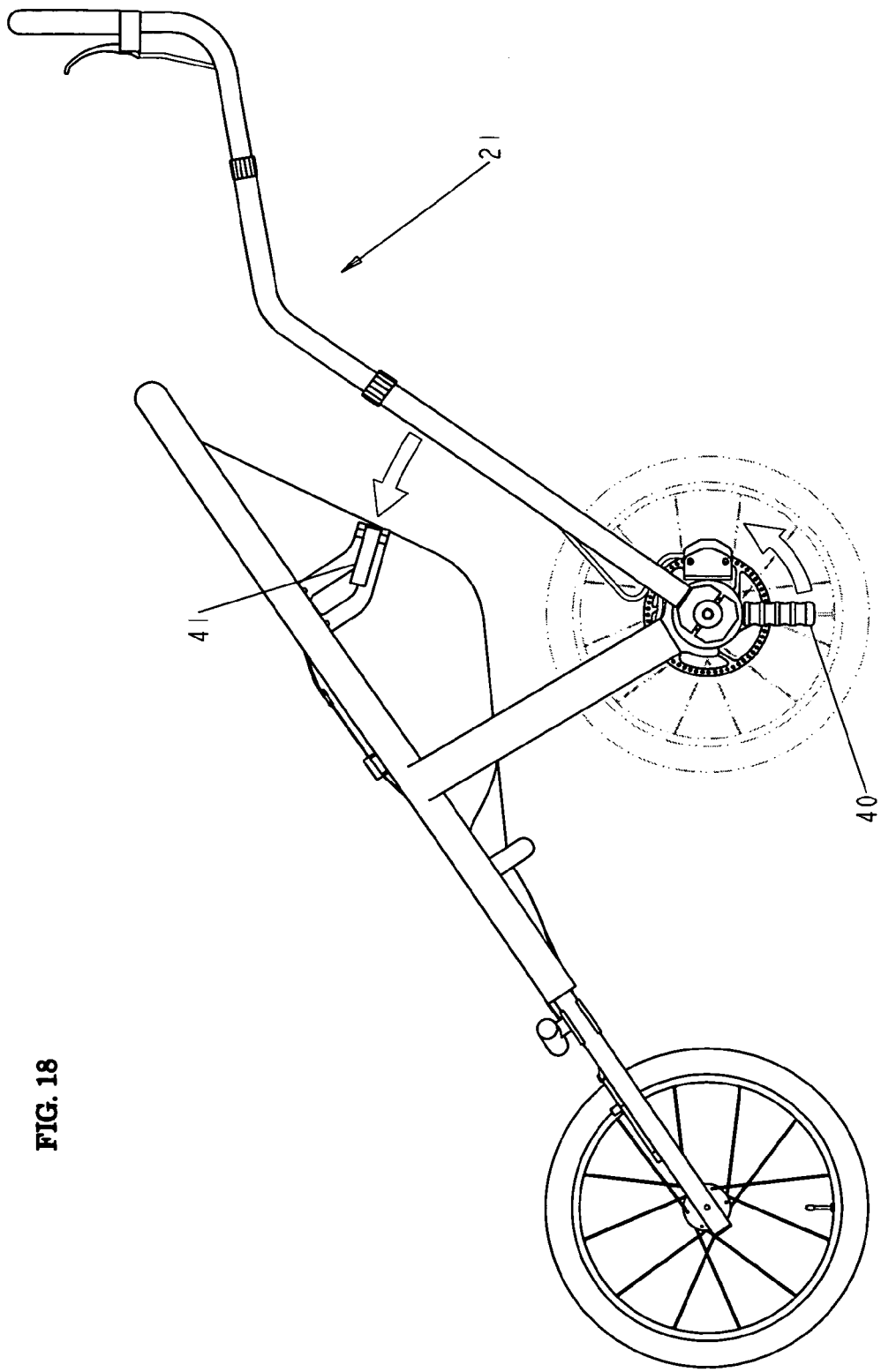
FIG. 18 is a side view of the stroller with the arms inline with each other while in the jogging position.
Figure 19:
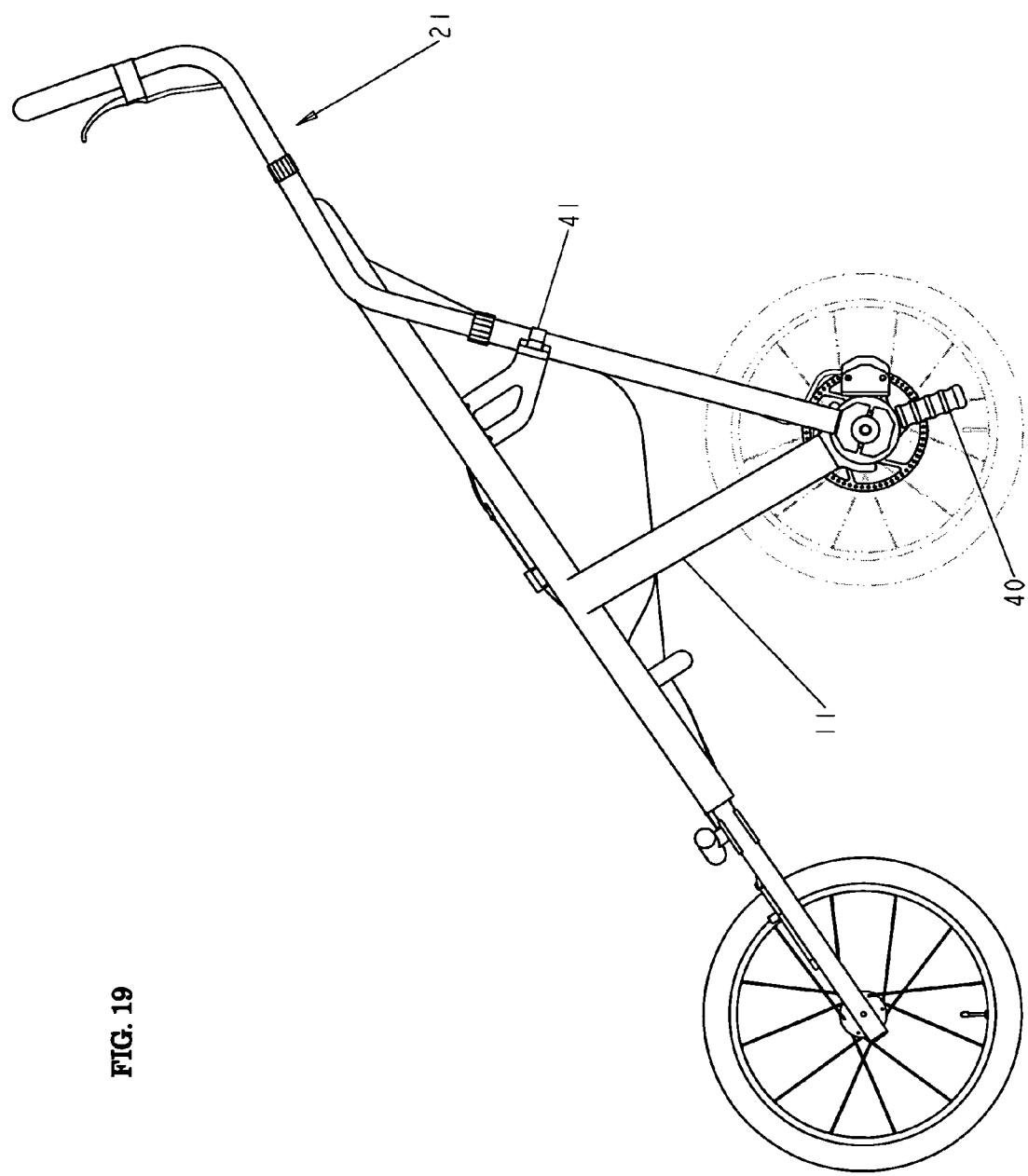
FIG. 19 is a side view of the stroller with the arms rotated to the walking position but the handgrips still in the jogging position.

FIG. 18 shows the stroller with the arms 21 in the jogging position. The arms 21 are in line with each other. FIG. 19 shows the stroller with the arms 21 rotated forward to the optional walking position. (Note, however, that a user may choose to walk with the stroller in the moving arm position.) In the walking position the arms 21 are coupled to the frame with clamps 41. Due to the positional interdependence, to move between the jogging and walking positions, the center pivot assembly 45 from FIG. 17 (detailed from FIG. 3) and the arms 21 must all rotate together. To rotate the center pivot assembly 45 and the arms 21 the handle 40 in FIG. 15 and FIG. 16 is turned to loosen the threaded stud 39 (FIG. 16) to reduce the clamping force between the housing 35 and the center disk 38. To rotate the center pivot assembly 45 and the arms 21 forward to the walking position, the handle 40 is pulled toward the back of the stroller, see arrow for direction in FIG. 18. This movement of the handle 40 results in the arms 21 moving from the neutral jogging position of FIG. 18 to the walking position of FIG. 19. Once in the walking position the arms 21 are secured to the frame with clamps 41 mounted to each side of the frame 11. The handle 40 is then re-tightened. The final step to convert to the walking position is to loosen the fitting 26 (FIG. 5), between the upper tube section 27 and the second tube section 25 and rotate the upper tube section 27 so the handgrip 22 is in a more horizontal position, see FIG. 14.

There will be occasions when the jogger needs to remove a hand from one of the arms 21 of FIG. 5. The stroller arm 21, which is still grasped by the jogger's other hand remains to do all of the work to push the stroller; however, with the positional dependence of the present invention it is required that there be a force to counter the forward force exerted by the jogger's remaining arm or the arm 21 of the stroller 10 would just move without resistance until it hit the clamp 41 mounted to the frame 11. To provide a counter force, the arms 21 are locked into their current positions by squeezing the optional brake handle 54 on the arm of the stroller. As seen in FIG. 5 and detailed in FIG. 20, a disk 55 is mounted to the split clamp 28 and when the brake handle 54 is squeezed a caliper style brake 56 grips the disk 55. The brake handle 54 has a lock button, which can be used to maintain this locked state where the arms will not rotate relative to each other. To unlock, the brake handle 54 is squeezed again and the caliper 56 unlocks from the disk 55. The other brake handle 68 is the brake for one of the stroller wheels, in this embodiment the front wheel.

Due to the positional dependence between the arms there is no need for external resistance devices to assist in propelling the stroller. Consider the right stroller arm. If the jogger were to place only his right hand on the right arm and move the arm forward, the arm would move forward, but, with no resistance, the stroller does not. However, since the right and left arms are coupled together, as the right arm moves forward the left arm will move backward. Now, if the jogger were to place his left hand on the left stroller arm he would feel the force supplied to the right stroller arm transferred into the left stroller arm. To equalize the forces the jogger would, through his left arm, exert the same force as his right arm. The net result is both arms are exerting forces in the forward direction and the stroller will move forward. The stroller requires a force, F, to move forward. At any instant during the motion of the stroller arms the jogger applies ½ F to one arm and reacts with a ½ F with the other arm to balance, such that the total from the jogger's left and right arms, ½ F+½ F=F the force needed to move the stroller forward.

Although the above invention has been described with respect to a three-wheeled stroller, it is understood that the invention also applies to other stroller configurations, such as four or more wheeled strollers. It is also understood that the occupant or occupants of the stroller may be any size, from an infant to a full-grown adult depending upon the size and configuration of the stroller. The invention also applies to wheeled vehicles for transporting freight, animals and other non-human cargo. The invention can also be applied to sports training and rehabilitation equipment; that is, the arm positional dependence mechanism could be attached to various loads for strength training. While the foregoing invention has been described in terms of the embodiments discussed above, numerous variations are possible. Accordingly, modifications and changes such as those suggested above, but not limited thereto, are considered to be within the scope of following claims.

What is claimed is:

1. A stroller comprising:
a seat designed to accommodate at least one passenger to be transported by the stroller,
a frame element and at least one wheel supporting the frame,
a first arm member configured to be gripped by a human hand mechanically coupled to the frame element such that the first arm member moves in a reciprocating manner with respect to the frame element,
a second arm member configured to be gripped by a human hand mechanically coupled to the frame element such that the second arm member moves in a reciprocating manner with respect to the frame element, and
a coupling member mechanically coupled to the first arm member and to the second arm member such that the reciprocating movement of the first arm member is substantially maintained in opposition to the reciprocating movement of the second arm member whereby the natural periodic movement of human arms during walking or jogging is facilitated,
wherein the at least one passenger is transported by the stroller in a substantially forward direction when a user who walks or jogs substantially behind the stroller applies forces to the first arm member and second arm member.

2. The stroller of claim 1, wherein the first arm member and the second arm member are mechanically coupled by a coupling member that comprises at least one gear.

3. The stroller of claim 1, wherein the first arm member and the second arm member are mechanically coupled by a coupling member that comprises at least one piston and fluid to move the piston.

4. The stroller of claim 1, wherein the first arm member and the second arm member are electromechanically coupled.

5. The stroller of claim 1, wherein the first arm member and the second arm member are mechanically coupled by a coupling member that comprises at least one link.

6. The stroller of claim 1, wherein the first arm member and the second arm member are configured such that they can be made substantially immobile with respect to the frame member for use as at least one handle.

7. The stroller of claim 6, wherein the first arm member and the second arm member form a single handle.

8. The stroller of claim 1, wherein the stroller comprises three wheels.

9. In a stroller, the improvement comprising:
a seat designed to accommodate at least one passenger to be transported by the stroller,
a first arm member configured to be gripped by a human hand mechanically coupled to the frame of the stroller such that the first arm member moves in a reciprocating manner with respect to the frame,
a second arm member configured to be gripped by a human hand mechanically coupled to the frame such that the second arm member moves in a reciprocating manner with respect to the frame,
a coupling member between the first and second arm members whereby the movement of the first arm member is constrained to be substantially the opposite of the movement of the second arm member thereby facilitating the natural periodic movement of human arms during walking, jogging or running,
wherein the at least one passenger is transported by the stroller in a substantially forward direction when a user who walks or jogs substantially behind the stroller applies forces to the first arm member and second arm member.

10. The stroller of claim 9, wherein the first arm member and the second arm member are mechanically coupled by a coupling member that comprises at least one gear.

11. The stroller of claim 9, wherein the first arm member and the second arm member are electromechanically coupled.

12. The stroller of claim 9, wherein the first arm member and the second arm member are mechanically coupled by a coupling member that comprises at least one piston and hydraulic fluid to move the piston.

13. The stroller of claim 9, wherein the first arm member and the second arm member are mechanically coupled by a coupling member that comprises at least one link.

14. The stroller of claim 9, wherein the stroller comprises three wheels.

15. The stroller of claim 9, wherein the first arm member and the second arm member are configured such that they can be made substantially immobile with respect to the frame member for use as at least one handle.

16. A stroller comprising:
a seat designed to accommodate at least one passenger to be transported by the stroller,
a frame element and at least one wheel attached to the frame, a first arm member configured to be gripped by a human hand mechanically coupled to the frame element such that the first arm member moves in a reciprocating manner with respect to the frame element,
a second arm member configured to be gripped by a human hand mechanically coupled to the frame element such that the second arm member moves in a reciprocating manner with respect to the frame element, and
a coupling member mechanically coupled to the first arm member and to the second arm member such that the position of the first arm member relative to the position of the second arm member can be defined with the mathematical equations:

$$y = A \sin((2\pi/B)x) c = -y$$

wherein, in one complete cycle of arm movement during the act of pushing the stroller, y equals the position of the left arm, c equals the position of the right arm, A equals amplitude and represents half the distance between one arm's maximum forward position and maximum back position, B equals period and represents the time to complete one cycle of arm movement and x is time, and
wherein the at least one passenger is transported by the stroller in a substantially forward direction when a user who walks or jogs substantially behind the stroller applies forces to the first arm member and second arm member.

17. The stroller of claim 16, wherein the first arm member and the second arm member are mechanically coupled by a coupling member that comprises at least one gear.

18. The stroller of claim 16, wherein the first arm member and the second arm member are mechanically coupled by a coupling member that comprises at least one piston and fluid to move the piston.

19. The stroller of claim 16 wherein the first arm member and the second arm member are electromechanically coupled or are coupled by a coupling member that comprises at least one link.

20. The stroller of claim 16, wherein the first arm member and the second arm member are configured such that they can be made substantially immobile with respect to the frame member for use as at least one handle.

* * * * *

UNITED STATES PATENT AND TRADEMARK OFFICE
CERTIFICATE OF CORRECTION

| | | |
|---|---|---|
| PATENT NO. | : 8,172,243 B2 | Page 1 of 1 |
| APPLICATION NO. | : 11/293199 | |
| DATED | : May 8, 2012 | |
| INVENTOR(S) | : Michael J. Dresher | |

It is certified that error appears in the above-identified patent and that said Letters Patent is hereby corrected as shown below:

In the drawings, the following figures should be deleted:

Signed and Sealed this

Eleventh Day of September, 2012

David J. Kappos
*Director of the United States Patent and Trademark Office*